(12) United States Patent
Shamaie et al.

(10) Patent No.: US 8,463,023 B2
(45) Date of Patent: Jun. 11, 2013

(54) ENHANCED INPUT USING FLASHING ELECTROMAGNETIC RADIATION

(75) Inventors: Atid Shamaie, Ottawa (CA); Francis MacDougall, Ottawa (CA)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/370,974

(22) Filed: Feb. 10, 2012

(65) Prior Publication Data

US 2012/0139837 A1    Jun. 7, 2012

Related U.S. Application Data

(63) Continuation of application No. 12/032,496, filed on Feb. 15, 2008, now Pat. No. 8,116,518.

(60) Provisional application No. 60/890,108, filed on Feb. 15, 2007.

(51) Int. Cl.
*G06K 9/00*     (2006.01)

(52) U.S. Cl.
USPC .......................................... 382/154; 345/156

(58) Field of Classification Search
None
See application file for complete search history.

(56) References Cited

U.S. PATENT DOCUMENTS

| | | | |
|---|---|---|---|
| 5,136,312 A | 8/1992 | Weaver et al. | |
| 5,164,992 A | 11/1992 | Turk et al. | |
| 5,454,043 A | 9/1995 | Freeman | |
| 6,421,042 B1 | 7/2002 | Omura et al. | |
| 6,501,846 B1 | 12/2002 | Dickinson et al. | |
| 6,526,156 B1 | 2/2003 | Black et al. | |
| 6,832,724 B2 | 12/2004 | Yavid et al. | |
| 6,971,071 B1 | 11/2005 | Impas et al. | |
| 7,834,846 B1 * | 11/2010 | Bell | 345/156 |
| 2008/0089587 A1 | 4/2008 | Kim et al. | |
| 2008/0106636 A1 * | 5/2008 | Wernersson | 348/371 |
| 2008/0165265 A1 | 7/2008 | Chiba et al. | |

FOREIGN PATENT DOCUMENTS

CN    1806432 A    7/2006

OTHER PUBLICATIONS

International Search Report and Written Opinion—PCT/US2006/000294—ISA—Dec. 26, 2007.
International Search Report and Written Opinion, PCT/US2008/054123, Dated Jul. 25, 2008 11 pages.
Matsuthita, et al., "HoloWall: Designing a Finger, Hand, Body, and Object Sensitive Wall," Association of Computing Machinery (ACM), 1997, pp. 209-210.

* cited by examiner

*Primary Examiner* — Claire X Wang
(74) *Attorney, Agent, or Firm* — Kilpatrick Townsend & Stockton LLP

(57) ABSTRACT

Enhanced input using flashing electromagnetic radiation, in which first and second images of an object are accessed. The first image being captured while the object is illuminated with projected electromagnetic radiation, and the second image being captured while the projected electromagnetic radiation is extinguished. A position of the object relative to the screen based on comparing the first and second images is determined. An application is controlled based on the determined position.

31 Claims, 12 Drawing Sheets

ENHANCED INPUT USING FLASHING ELECTROMAGNETIC RADIATION

CROSS-REFERENCES TO RELATED APPLICATIONS

The present application is a continuation patent application of U.S. patent application Ser. No. 12/032,496, filed Feb. 15, 2008, entitled "ENHANCED INPUT USING FLASHING ELECTROMAGNETIC RADIATION," now U.S. Pat. No. 8,116,518, which claims the benefit of U.S. Provisional Application No. 60/890,108, filed Feb. 15, 2007, both of which are incorporated herein by reference in their entirety.

TECHNICAL FIELD

The present disclosure generally relates to user input.

BACKGROUND OF THE INVENTION

If an object in the vicinity of a screen is illuminated by both a constant source of light and ambient light, the ambient light may not be sufficiently distinguishable from the constant source of light to allow a reflection of the constant source off of the object to be used for user input.

BRIEF SUMMARY OF THE INVENTION

In one general implementation, an object is illuminated with flashing light, where ambient light behind a screen is detected during an off-period of the flashing light and filtered from an image of the screen, in real-time or near-real-time. Based on the filtering operation, a two-dimensional or three-dimensional position or motion of the object relative to the screen may be discerned and used to control an application, such as by mapping the detected position or motion to a control input or mouse event.

In a further general implementation, first and second images of an object are accessed. The first image being captured while the object is illuminated with projected electromagnetic radiation, and the second image being captured while the projected electromagnetic radiation is extinguished. A position of the object relative to the screen based on comparing the first and second images is determined. An application is controlled based on the determined position.

Implementations may include one or more of the following features. Electromagnetic radiation may be projected as a first light curtain along and parallel to the second side of the screen. Electromagnetic radiation may be projected as a second light curtain adjacent and parallel to the second side of the screen, the first light curtain and the second light curtain being parallel to each other and disposed at a first location and a second location with respect to the second side of the screen. The object may include a portion of a body of a person. A second position may be determined and the application may be controlled based on the determined position and the second position. Determining a position of the object relative to the screen based on comparing the first and second images may include subtracting the first and second images to create a difference image. Determining a position of the object relative to the screen may include determining the location of the object in the difference image.

In some example implementations, controlling an application based on the determined position may include controlling a cursor. The projected electromagnetic radiation may include infrared radiation. A visible image may be projected onto the screen, the object may be in motion, and controlling an application based on the determined position may include controlling a cursor on the visible image such that motion of the cursor corresponds to the motion of the object. The motion of the object may include a gesture made by a person.

In some example implementations, accessing first and second images may include accessing first and second images of an object and a second object, the object and the second object disposed on the same side of the screen, and a position of a second object relative to the screen may be determined. A shadow cast on the screen may be modeled, where the shadow may be cast by the object while the object is illuminated with the projected electromagnetic radiation. It may be determined, based on the model, that the shadow obscures a second object. Determining a position of the second object relative to the screen may include accounting for the shadow.

In another general implementation, a system includes a translucent screen including a first side and a second side and a source of electromagnetic radiation, the source configured to alternate between emitting the electromagnetic radiation and extinguishing the electromagnetic radiation at a rate of flashing. A sensor is positioned on a first side of the screen and configured to sense electromagnetic radiation at the rate of flashing, and the electromagnetic radiation is reflected from an object disposed in the vicinity of the screen on the second side of the screen. The system also includes a processor configured to determine a position of the object based on the sensed electromagnetic radiation, and control an application based on the determined position of the object.

Implementations may include one or more of the following features. The screen may include edges, and the source of electromagnetic radiation may include a linear array of emitters positioned along one or more of the edges of the screen such that electromagnetic radiation is projected on the, and parallel to, the second side of the screen. The screen may be a parallelogram. The source of electromagnetic radiation may include a series of linear arrays of emitters, and each of the linear arrays may be positioned on the second side of the screen at a distance from a surface of the screen. The source of electromagnetic energy may emit diverging electromagnetic energy, a channel may be adjacent to the source, where the channel may be configured to collimate the emitted electromagnetic energy. The channel may include a block of material with a passageway extending through the block from an entry to an exit, and diverging electromagnetic radiation may impinging on the entry and a portion of the diverging electromagnetic radiation may emerge from the exit as collimated electromagnetic radiation. The channel may include a lens. The source of electromagnetic radiation may include an emitter positioned on the first side of the screen and the electromagnetic radiation passes through the screen and reflects off the object. The source of electromagnetic radiation may be a light emitting diode. The light emitting diode may emit infrared radiation. The sensor may be an array of pixels. The processor also may be configured to model a shadow cast by the object and determine a position of a second object disposed on the second side of the screen based on the modeled shadow.

Implementations of any of the techniques described above may include a method or process, a system, or instructions stored on a storage device. The details of particular implementations are set forth in the accompanying drawings and description below. Other features will be apparent from the following description, including the drawings, and the claims.

DETAILED DESCRIPTION OF THE INVENTION

In one general implementation, an object is illuminated with flashing light, where ambient light behind a screen is detected during an off-period of the flashing light and filtered from an image of the screen, in real-time or near-real-time. Based on the filtering operation, a two-dimensional or three-dimensional position or motion of the object relative to the screen may be discerned and used to control an application, such as by mapping the detected position or motion to a control input or mouse event.

Figure 1A:
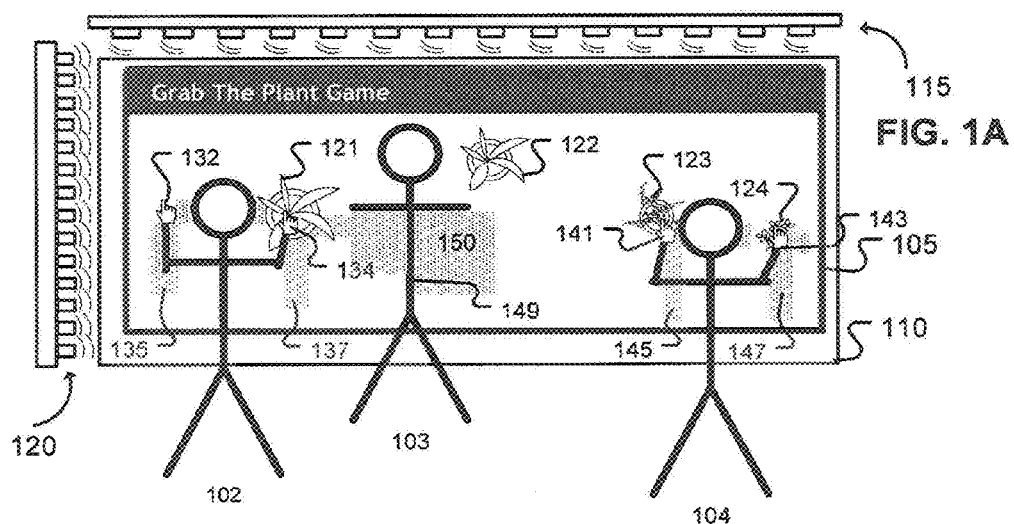
FIGS. 1A to 1C provide a contextual diagram of an exemplary system.

For instance, and referring to FIG. 1A, a system 100 allows users 102, 103, and 104 to interact with an application 105 that is displayed on a translucent screen 110 without necessarily touching the screen 110. In the example shown, the users 102, 103, and 104 move objects through a curtain of light (which also may be referred to as a "light curtain" and/or a "plane of light") projected parallel to and in front of the screen 110 in order to interact with the application 105. In the example shown in FIG. 1A, the application 105 is a "Grab the Plant" game.

The light curtain is formed by electromagnetic radiation emitted from sources 115 and 120. The electromagnetic radiation may be light. To interact with the application 105, the users 102, 103, and 104 may move or place objects, such as a hand or a stick, towards the screen 110 to break the light curtain. Movement, hovering, and/or placement of objects in the light curtain may cause the system 100 to issue a sequence of mouse events (or other I/O events) to the application 105, effecting the control of the application 105. Thus, the users 102, 103, and 104 can control the application 105 by moving, placing, or hovering objects such that the objects are illuminated by the light curtain.

As described in more detail below, motion, placement, and/or position of the objects with respect to the screen 110 is determined and used to control the application 105. In particular, objects placed in the light curtain reflect electromagnetic energy projected from the sources 115 and 120, and the reflected electromagnetic energy is sensed by a sensor such as a pixel, an array of pixels, or a camera. Positions or motion of the objects are determined based on the sensed energy, and the application 105 is controlled based on the determined position or motion. In addition to the objects reflecting light from the sources 115 and 120 on to the screen 110, the objects also may reflect ambient light, or the ambient light may itself illuminate the screen 110. The ambient light may appear in images and would otherwise be erroneously detected as an object.

In order to distinguish light from the sources 115 and 120 that is reflected by the objects from ambient light spots that may be mistaken as objects, the sources 115 and 120 emit electromagnetic radiation in a predetermined pattern or sequence (e.g., the sources 115 and 120 and the light curtain are flashing) such that objects illuminated by the light curtain also are illuminated at the predetermined pattern or sequence. Thus, actual objects appear in images collected while the sources 115 and 120 emit radiation, whereas ambient light spots appear in all images, including those collected while the sources 115 and 120 are not emitting electromagnetic radiation. By comparing images collected while the sources 115 and 120 emit electromagnetic radiation to images collected while the sources 115 and 120 are extinguishing electromagnetic energy, actual objects may be distinguished from stray spots on the screen 110 that are caused by ambient light. The sensor is synchronized, or tuned, with the predetermined pattern or sequence such that the sensor alternates collecting images of the screen while the objects are illuminated by the sources 115 and 120 and while the objects are not illuminated by the sources 115 and 120.

In the example shown in FIG. 1A, the "Grab the Plant" game 105 allows users to select a plant from among plants 121, 122, 123, and 124 that are projected on the screen 110. Once a plant is selected, the game 105 presents an enlarged and shaded version of the selected plant. The user 102 selects the plant 121 with his right hand 134, and the user 104 selects the plants 123 and 124. In this example, the user 102 places hands 132 and 134 into the light curtain and selects the plant 121 by, for example, making a gesture with the hand 134 while the hand 134 is illuminated by the light curtain or by hovering the hand over the plant 121 while the hand 134 is illuminated by the light curtain. The hands 132 and 134 cast shadows 135 and 137, respectively. The user 104 places hands 141 and 143 in the light curtain and selects the plants 123 and 124. The hands 141 and 143 cast shadows 145 and 147, respectively. Rather than selecting a particular plant with a hand or other object, the user 103 has placed a large portion 149 of their body in the light curtain. The body of the user 103 may or may not cast a shadow 150, depending upon the configuration of the light curtain.

Figure 1B:
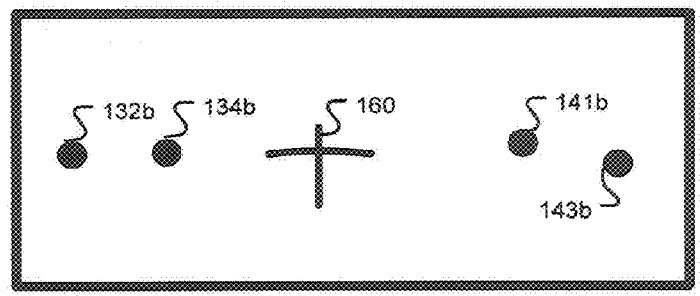

Referring to FIG. 1B, representations of positions of the hands 132, 134, 141, 143, and the portion 149 of the body that breaks the light curtain are shown. Positions 132b and 134b are determined to correspond to the positions of the hands 132 and 134 with respect to the screen 110, and positions 141b and 143b correspond to the positions of the hands 141 and 143 with respect to the screen 110. A position 160 corresponds to the position of the portion 149 of the body of the user 103. As discussed in more detail below, the system 100 analyzes the size and shape, among other features, of reflections on the screen 110 made by objects illuminated by the curtain of light, to determine how to control the application 105. In this example, the portion 149 of the body of the user 103 is too large to be a selection, and thus the position 160 may be deemed an error and ignored.

Figure 1C:
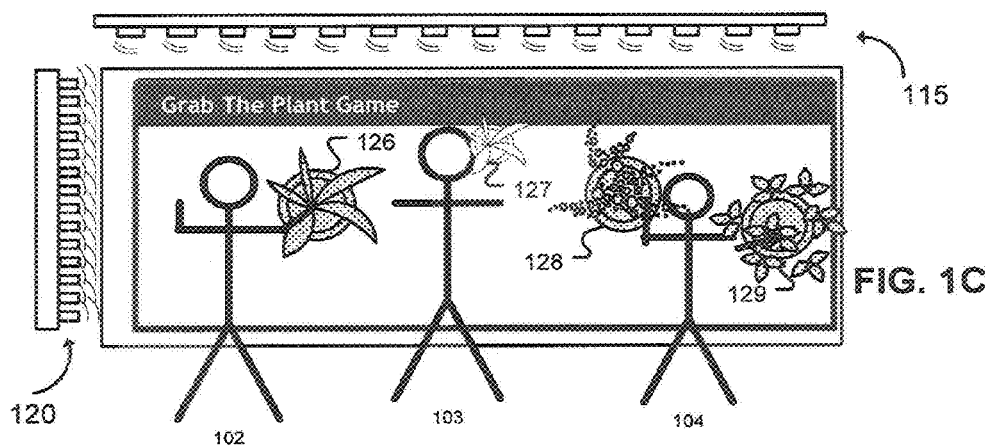

Referring to FIG. 1C, the application 105 is controlled based on the determined positions. The position 134b corresponds to a selection of the plant 121, and the plant 121 is enlarged into the plant 126 as a result of the selection. Similarly, the position 141b and the position 143b correspond to selections of the plants 123 and 124, respectively, and the plants 123 and 124 are enlarged into the plants 128 and 129, respectively. In contrast, the error 160 does not select the plant 122, as it is automatically determined to too large to be a control selection or because it does not touch a region of a screen upon which a plant is projected. The position 132b does not correspond to a plant, thus the position 132b does not cause any of the plants 121-124 to become enlarged.

Figure 2:
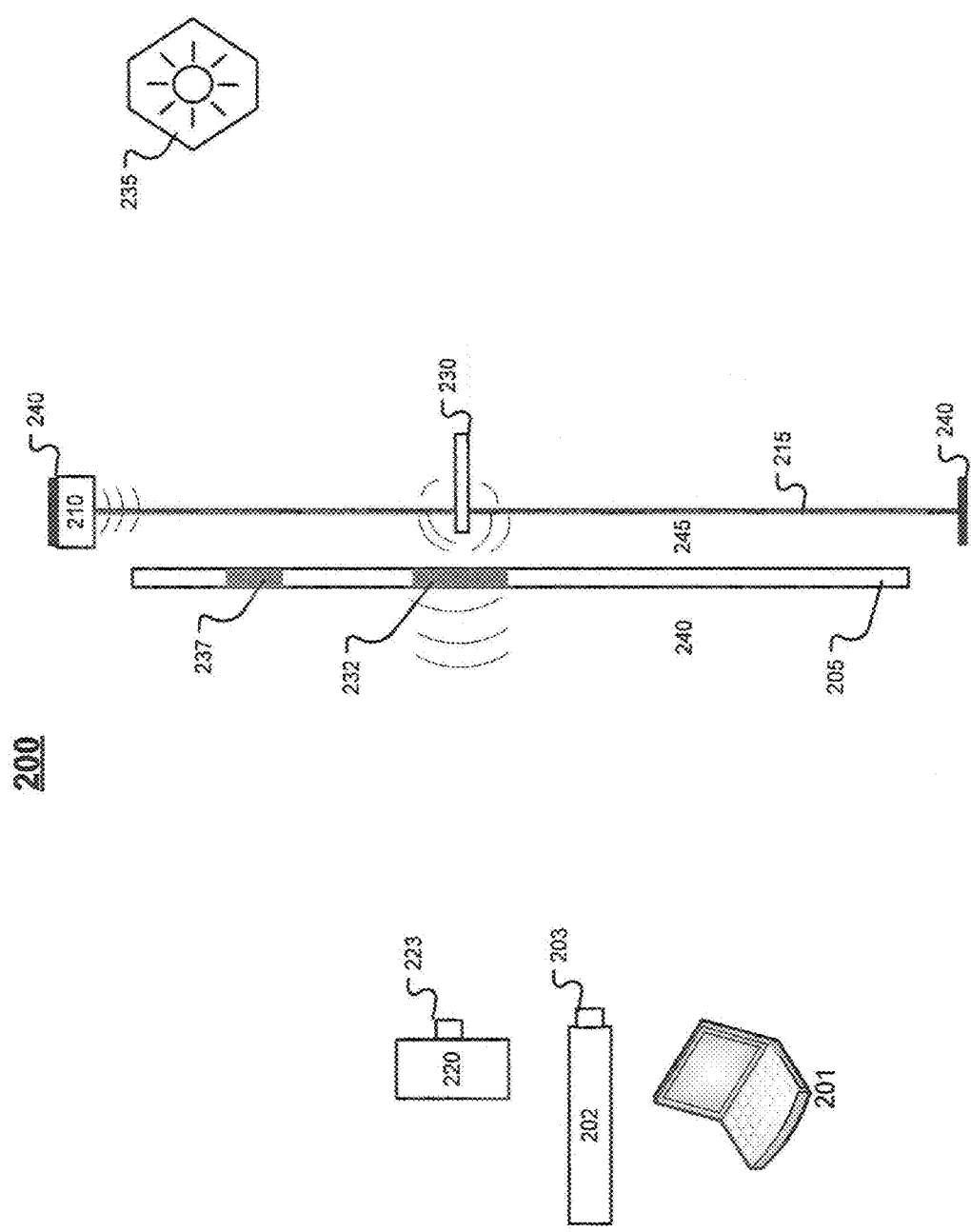
FIGS. 2 to 4, 7A to 7D, 9, and 10 show exemplary systems that allows users to interact with an application.

Referring to FIG. 2, a side view of a system 200 is illustrated. The system 200 allows a user to interact with an application, which may be running on a computing device 201. The application is projected by a projector 202 onto a translucent screen 205. The application may be an application such as the game "Grab the Plant" 105 discussed above with respect to FIGS. 1A-1C. In other examples, the application may be any other computer program such as, for example, a presentation application, image and/or video editing software, or an electronic mapping application.

The system 200 includes the projector 202, the screen 205, a source 210 that projects electromagnetic radiation into a light curtain 215, and a sensor 220 that images the screen 205. In particular, the sensor 220 senses electromagnetic radiation reflected from an object 230 onto the screen 205 as the object is illuminated by the light curtain 215. The radiation reflected from the object 230 causes a bright spot 232 to appear on the screen 205. The sensor 220 also images other bright spots on the screen, such as bright spots caused by an ambient light source 235. In the example shown, the bright spot 237 is caused by an ambient light source 235. In addition to reflecting electromagnetic radiation emitted from the source 210, the object 230 also may reflect ambient light from an ambient light source 235. The source 210 may be included in a frame 240 that fits around the screen 205.

The screen 205 is a translucent, transparent, or semi-transparent screen onto which the projector 202 projects an image of the application. The screen 205 may be made from, for example, glass, plexiglass, semi-transparent plastic, or any other transparent or semi-transparent material. For instance, the screen may be a window in a store, or a specialized screen (for example in a crowded area such as a mall or airport) upon which images are projected and interaction is solicited, or the screen may be disposed in an entertainment facility such as a theater, arcade, or bar. The projector 202 may include a filter 203 to remove infrared radiation from the image projected by the projector 202.

The source 210 may be any emitter of electromagnetic radiation. For example, the source 210 may be a laser, a light emitting diode (LED), or a broadband light source. The source 210 alternates between emitting electromagnetic radiation and not emitting electromagnetic radiation. Thus, the source may be considered to flash at a flashing sequence or pattern, and the light curtain 215 is a flashing light curtain in contrast to a light curtain that provides constant illumination. In some implementations, the electromagnetic radiation emitted from the source 210 is infrared radiation including wavelengths beyond the perception of a human typical eye. Thus, in these implementations, the light curtain 215 is invisible to a user of the system 200. Similarly, in these implementations, light reflected by the object 230 onto the screen 205 is also invisible to the user. Thus, the light reflected onto the screen 205 does not interfere with the user's view of the projected application. In other implementations, the source 210 may emit electromagnetic radiation with wavelengths in the visible band (e.g., 400 nanometers to 700 nanometers).

The sensor 220 is synchronized with the source 210 such that the sensor 220 alternates between sensing data while the source 210 is emitting electromagnetic radiation and while the source 210 is extinguishing the electromagnetic radiation at a rate of flashing. For example, the sensor 220 may be a camera that captures frames, or images, at thirty, sixty, or one hundred twenty frames per second. In this example, the source 210 emits electromagnetic energy such that every other frame collected by the source 210 is an image captured while the light curtain 215 is illuminated. A filter 223 may be positioned in front of and/or integrated with the sensor 220 such that electromagnetic radiation that has a wavelength of the radiation emitted from the source 210 is sensed by the sensor 220.

The object 230 may be a finger or a hand of a user, a pointer, a stylus, or another similarly sized object. The object 230 reflects electromagnetic radiation on to the screen 205 as the object 230 is illuminated by the light curtain 215. The reflected electromagnetic radiation passes through the screen 205 and is sensed by the sensor 220. The ambient light source 235 may be an incandescent light bulb (such as from a canned ceiling fixture), or sunlight. Radiation from the ambient light source 235 also appears on the screen as bright spots, such as the bright spot 237. The bright spot 237 on the screen caused by the ambient light source 235 is also sensed by the sensor 220 and is present in the data collected by the sensor 220. The ambient light source 235 may be stationary or, at most, only slowly moving. Thus, the ambient light source 235 causes a bright spot 237 to appear in the data collected by the sensor 220 over a particular time period, and the bright spot 237 appears in generally the same portion of the data collected at different times within the time period. Subtracting, or otherwise comparing the data over the time period collected while the source 210 emits radiation to data collected while the source is not emitting radiation results in the removal of the energy from the ambient light source 235 from the data. However, because the electromagnetic radiation reflected from the object 230 as a result of the object being illuminated by the light curtain 215 is only present in data collected by the sensor 220 while the source 210 is emitting electromagnetic radiation, comparing the data does not result in the removal of an image of the object 230. This, use of the flashing light curtain 215 allows bright spots on the screen that are caused by the presence of actual objects (such as the bright spot 232) to be distinguished from spots on the screen 205 that are caused by radiation from the ambient light source 235 (such as the bright spot 237).

In the implementation shown in FIG. 2, the sensor 220 is located on a first side 240 of the screen 205 and the source 210 is located on a second side 245 of the screen 205. Thus, the light curtain 215 is also located on the second side 245 of the screen 205. In implementations in which the sensor 220 and the source 210 are located on opposite sides of the screen 205, electromagnetic radiation reflected from the object 230 passes through the screen 205 and is sensed by the sensor 220. In other implementations, such as the implementation shown in FIG. 9, the source 210 and the sensor 205 may both be located on the first side 240 of the screen 205. In these implementations, the electromagnetic radiation emitted from the source 210 passes through the screen 205 and illuminates the object 230. The object 230 reflects the electromagnetic radiation, and the reflected electromagnetic radiation passes through the screen 205 and is sensed by the sensor 220.

Figure 3:
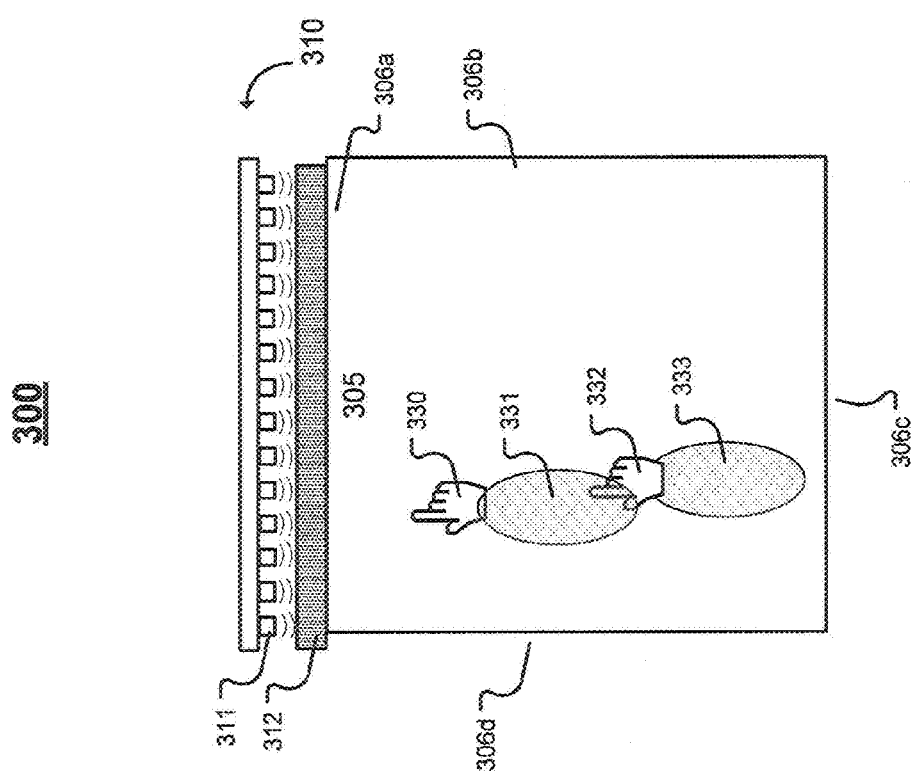

Referring to FIG. 3, a front view of a system 300 is illustrated. The system 300 may be similar to the system 200 discussed with respect to FIG. 2. The system 300 includes a screen 305 and a source 310 that projects a light curtain of electromagnetic radiation parallel to and in front of the screen 305. The source 310 is configured to alternate between emitting the electromagnetic radiation and extinguishing the electromagnetic radiation at a rate of flashing. In the example shown in FIG. 3, the source 310 is a linear array of emitters 311 positioned along an edge 306a of the screen 305. The emitters 311 may be, for example, line lasers and/or infrared LEDs. The electromagnetic energy emitted from the emitters 311 may be divergent, and the divergent electromagnetic energy is passed through a channel 312 to make the electromagnetic radiation into a thin light curtain that is parallel to and above a surface of the screen 205. Details of the channel 312 are discussed below.

The screen 305 also includes edges 306b, 306c, and 306d. In other examples, the screen 305 may include more or fewer edges. In other examples, such as the example illustrated in FIG. 7, more than one edge of the screen 305 may have a corresponding source positioned along the edge. The electromagnetic radiation projected as the light curtain illuminates objects 330 and 332, and the objects 330 and 332 cast shadows 331 and 333, respectively. The objects 330 and 332 may be, for example, hands, wands, and/or pointers. The shadow 331 partially obscures the object 332. Because the position of the object 330 is determined, and the location of the source 310 is known, the shape, size, and/or location of the shadow 331 may be modeled. Modeling the shadow 331 may be used to, for example, determine blind spots on the screen 305 where the position of additional objects, such as the object 332, may not be detected accurately or may not be detected at all.

Figure 4:
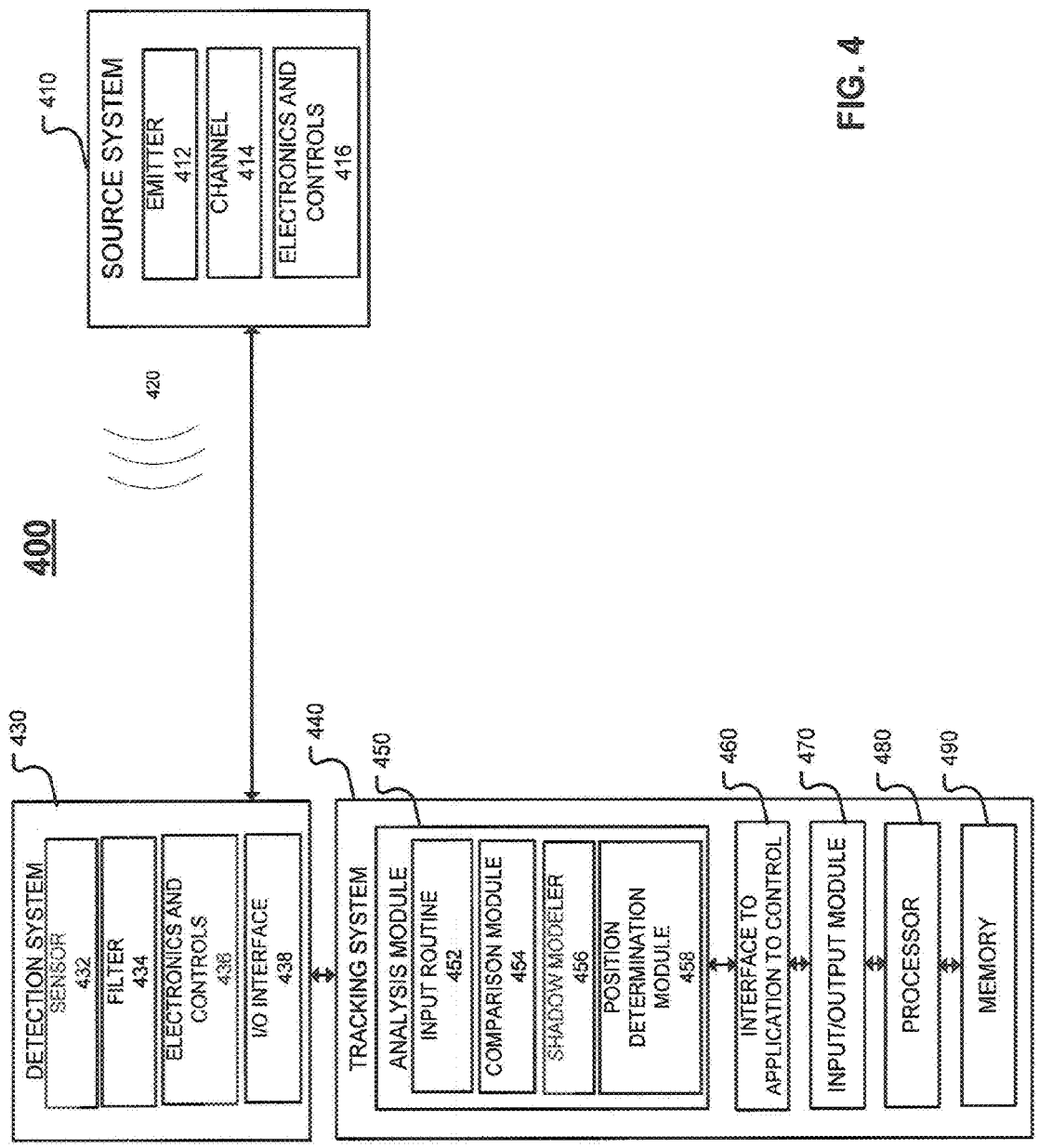

Referring to FIG. 4, a system 400 for determining and/or tracking positions of objects with respect to a screen is illustrated. The system includes a source system 410, a detection system 430, and a tracking system 440. The source system 410 produces a light curtain parallel to and adjacent to a surface of the screen, such as the light curtain 215 discussed above with respect to FIG. 2. The detection system 430 senses radiation reflected from an object illuminated by the light curtain, and the tracking system 440 determines a position or motion of the object with respect to the screen.

The source system 410 generates a flashing light curtain or other projected electromagnetic illumination that may be used to illuminate objects on one side of a screen. The source system 410 includes an emitter 412 and electronics and controls 416 to control the emitter 412. The source system 410 also may include a channel 414 to create a thin light curtain from an emitter that emits divergent electromagnetic radiation such as an LED. The electronics and controls 416 include electronics coupled to the emitter 412 that cause the emitter 412 to flash. For example, the electronics and controls 416 cause the emitter 412 to alternate between emitting the electromagnetic radiation and extinguishing the electromagnetic radiation at a rate of flashing. The emitter 412 may be an infrared emitter that emits infrared electromagnetic radiation having a wavelength above 680 nanometers. In some implementations, the emitter 412 may emit visible light.

Electromagnetic radiation 420 from the source system 410 illuminates an object on one side of a screen, and electromagnetic radiation is reflected from the object onto the screen and sensed by the detection system 430. In particular, the detection system 430 images the screen. The detection system 430 includes a sensor 432, a filter 434, sensor electronics and controls 436, and an input/output ("I/O") interface 438. In some implementations, the detection system 430 may be a digital camera, and the sensor 432 may be an array of pixels included in the camera. The filter 434 may be a filter that blocks electromagnetic radiation that has wavelengths other than the wavelengths of the electromagnetic radiation produced by the emitter 412. The I/O interface 438 may communicate with the tracking system 440 and/or the source system 410 to send a signal to the source system 410 that allows the source system 410 and the detection system 430 to be synchronized. For example, in implementations where the detection system 430 is a camera that collects data in frames, the I/O interface 438 may send a signal to the source system 410 at the beginning of each frame. The camera may collect thirty frames of data per second. The electronics and controls 416 of the source system 410 receive the signal and control the emitter 412 such that the emitter 412 alternates between emitting the electromagnetic radiation and extinguishing the electromagnetic radiation at a rate that allows every other frame of data collected by the camera to be an image of the screen captured while the emitter 412 is emitting electromagnetic radiation.

The system 400 also includes the tracking system 440. The tracking system 440 determines a position of an object illuminated by the light curtain from an image of the screen collected by the detection system 430. The tracking system 440 uses the determined position to control an application, such the application 105 discussed above with respect to FIGS. 1A-1C. The tracking system 440 includes an analysis module 450, an interface to an application to control 460, an input/output module 470, a processor 480, and a memory 490.

The analysis module 450 determines a position of the object illuminated by the tracking system light curtain. The analysis module 450 includes an input routine 452 that imports data from the detection system 430 into the analysis module 450. The import routine 452 also may transform the data from the detection system 430 into a format that can be processed by the analysis module 450. The analysis module 450 also includes a comparison module 454 that compares data collected at different times by the detection module 430. For example, the comparison module 454 may subtract data collected by the detection module 430 while the emitter is emitting radiation from data collected by the detection module 430 while the emitter 412 is extinguishing radiation.

The analysis module 450 also includes a shadow modeler 456 that models shadows cast by the objects illuminated by the light curtain in order to determine blind spots on the screen in which positions of objects are not detected, accurately or at all, even when objects are present. The analysis module 450 also includes a position determination module 458 that determines a position of an object illuminated by the light curtain with respect to a screen. In particular, the object illuminated by the light curtain reflects light onto the screen. As a result, an image of the screen captured by the detection system 430 has a bright spot at a location corresponding to the location of the object with respect to the screen. In some implementations, the object moves and the position determination module 458 tracks the object as it moves through the light curtain. In some implementations, the motion of the object may be a gesture of a user's hand. In these implementations, the position determination module 458 determines that a particular gesture has been made. The particular gesture may signify that an application controlled through the motion of the object is to perform a certain action.

The tracking system 440 also includes an interface 460 that passes the position determined by the position determination module 458 to an application that is controlled based on the determined position. For example, the application may be a game, and the game may be controlled based on motion of a cursor. The motion of the cursor may correspond to the motion of the object illuminated by the light curtain. The tracking system 440 also includes an input/output module 470. The input/output module 470 may include a port that interfaces with the detection system 430. The input/output module 470 may include a mouse, stylus, keyboard, printer, and/or any other input/output device that allows a user to interact with the tracking system 440. The input/output module 470 may include a port or interface that enables an automated process or machine to interact with the tracking system 440.

The tracking system 440 also includes a processor 480 and a memory 490. The tracking system 440 may include more than one processor and more than one memory. The processor 480 may be a processor suitable for the execution of a computer program such as a general or special purpose microprocessor, and any one or more processors of any kind of digital computer. Generally, a processor receives instructions and data from a read-only memory or a random access memory or both. The processor 480 receives instruction and data from the components of the workflow navigation system tracking system 440 to, for example, determine the position of objects with respect to a screen.

Figure 5:
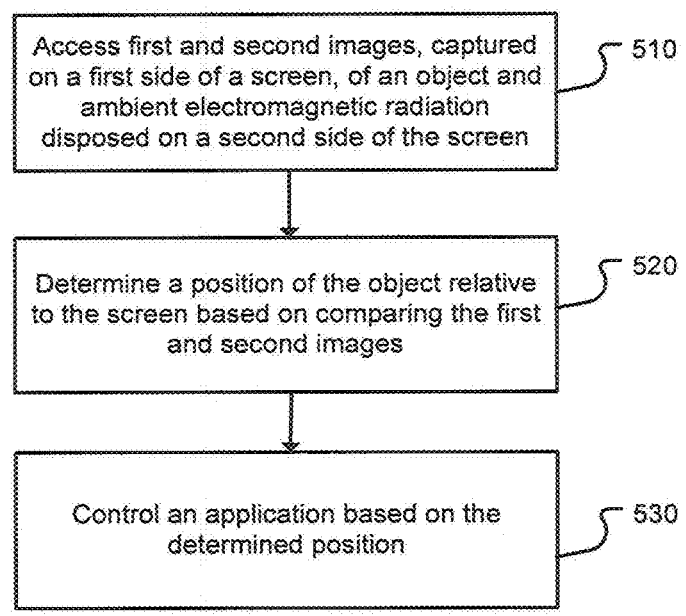
FIG. 5 is a flowchart illustrating an exemplary process for determining a position of an object.

Referring to FIG. 5, an example process 500 for determining the position of an object illuminated by a flashing light curtain is illustrated. The process 500 may be performed by, for example, one or more processors included in a system such as the systems 200, 300, and/or 400 discussed above. For example, the process 500 may be performed by the processor 480 included in the tracking system 440 discussed with respect to FIG. 4.

First and second images of an object and ambient radiation are accessed (510). The first and second images are captured on a first side of a screen and the object and the ambient radiation are disposed on a second side of the screen. The first image is captured while the object is illuminated with projected radiation, and the second image is captured while the projected radiation is extinguished. Returning briefly to FIG. 2 as an example, the first side of the screen may be the first side 240 of the screen 205 and the second side of the screen may be the second side 245 of the screen 205. The object may be an object such as the object 230 and the ambient radiation may be a source such as the ambient light source 235. The projected radiation may be a light curtain that flashes such as the light curtain 215.

Returning to FIG. 5, a position of the object relative to the screen is determined based on comparing the first and second images (520). For example, the first and second images may be compared by subtracting the first and second images. An application is controlled based on the determined position (530).

Figure 6:
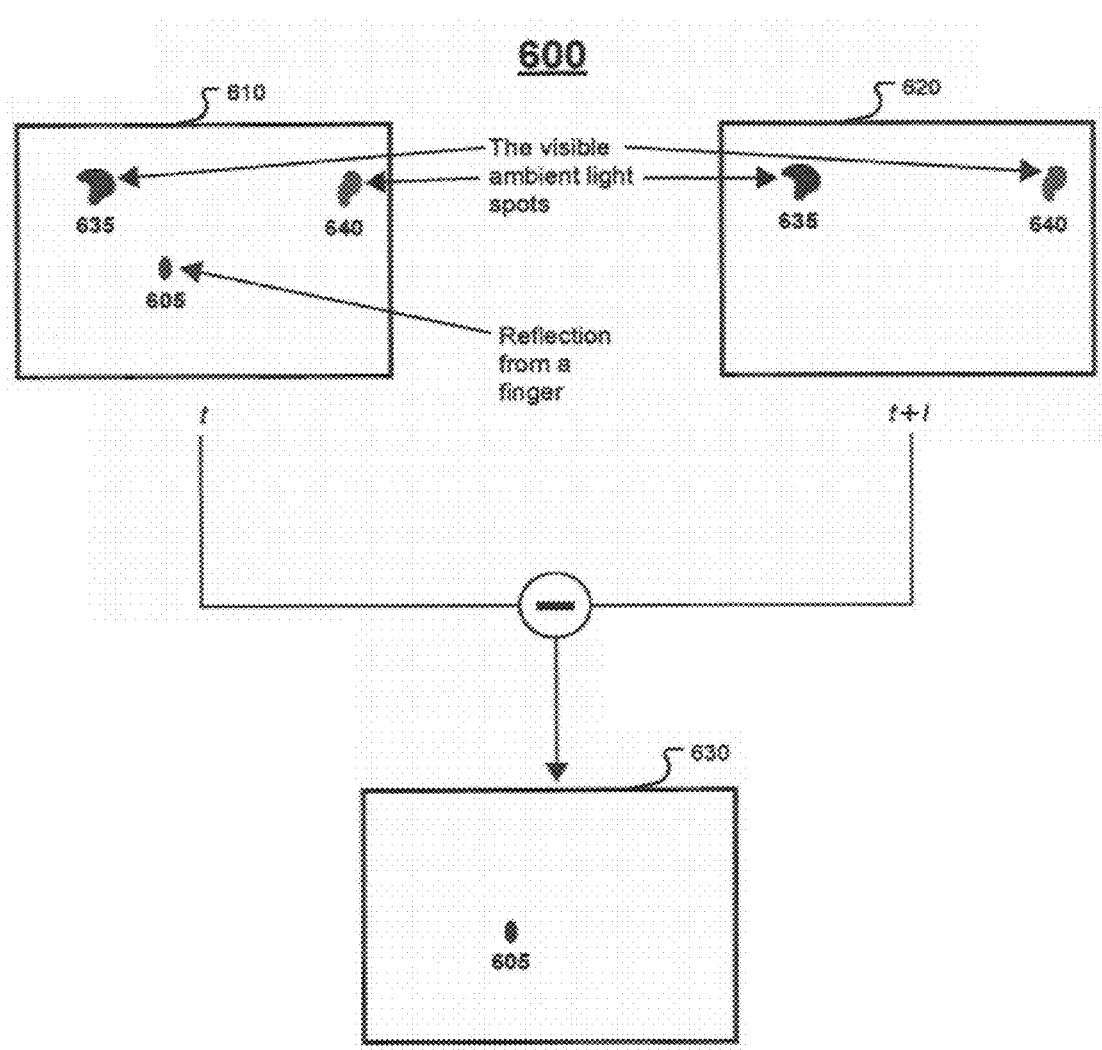
FIG. 6 illustrates two example input images and a resulting difference image.

Referring to FIG. 6, an illustration 600 of example data used to determine a position of an object is shown. In particular, the data shown in the illustration 600 shows the removal of ambient light. The example data in the illustration 600 may be used in a process, such as the process 500, to determine the position of an object with respect to a screen in the presence of ambient radiation. A light curtain, is projected parallel to and along one side of the screen. While the object (in this example, the object is a finger) is illuminated by the light curtain, the object reflects light from the light curtain onto the screen such that an image of the screen includes a bright spot 605 corresponding to the location of the finger with respect to the screen.

Images 610 and 620 are images of the screen, and the images 610 and 620 may be collected by, for example, the detection system 430 discussed with respect to FIG. 4. In the example show, the image 610, which includes the bright spot 605 caused by reflection of electromagnetic radiation from the finger, is collected at a time t when the finger is illuminated by the light curtain. The image 620, which does not include a bright spot corresponding to the finger, is collected at a time t+1 when the finger is not illuminated by the light curtain. For example, the image 610 may be collected while one or more emitters emit electromagnetic radiation, and the image 620 may be collected while the one or more emitters are extinguishing electromagnetic radiation. Thus, if the finger 605 touches the screen, or is close to the screen such that the finger is illuminated by the light curtain, a bright spot 605 caused by reflections from finger onto the screen appear in images of the screen captured while the finger is illuminated by the flashing light curtain.

The images 610 and 620 also include bright spots 635 and 640 caused by ambient light sources. For example, the bright spots 635 and 640 may be a result of ambient light sources shining directly on the screen or radiation from ambient light sources being reflected onto the screen. In contrast to the bright spot 605, which is caused by light reflecting from a finger and is only present when the finger is illuminated by the flashing light curtain, the bright spots 635 and 640 caused by the ambient light sources are included in every captured image. Thus, by subtracting consecutive frames from each other (such as the images 610 and 620) to create a difference image 630, the bright spots 635 and 640 caused by ambient light sources are removed, but the bright spot 605 caused by reflections from the finger remain.

Because the light curtain illuminates a shallow region in front of the screen, the tip of the finger is illuminated by the curtain of light, and the tip of the finger reflects light onto the screen. Additional processing beyond subtracting the frames 610 and 620 may be performed to determine the size, pose, or position of the finger and/or to verify that the finger is an actual object being illuminated by the flashing curtain of light. For example, the size and shape of the bright spot 605 caused by reflections from the finger may be analyzed to determine whether a finger is actually present. Additionally, multiple users may interact with the application through the light curtain.

Figure 7A:
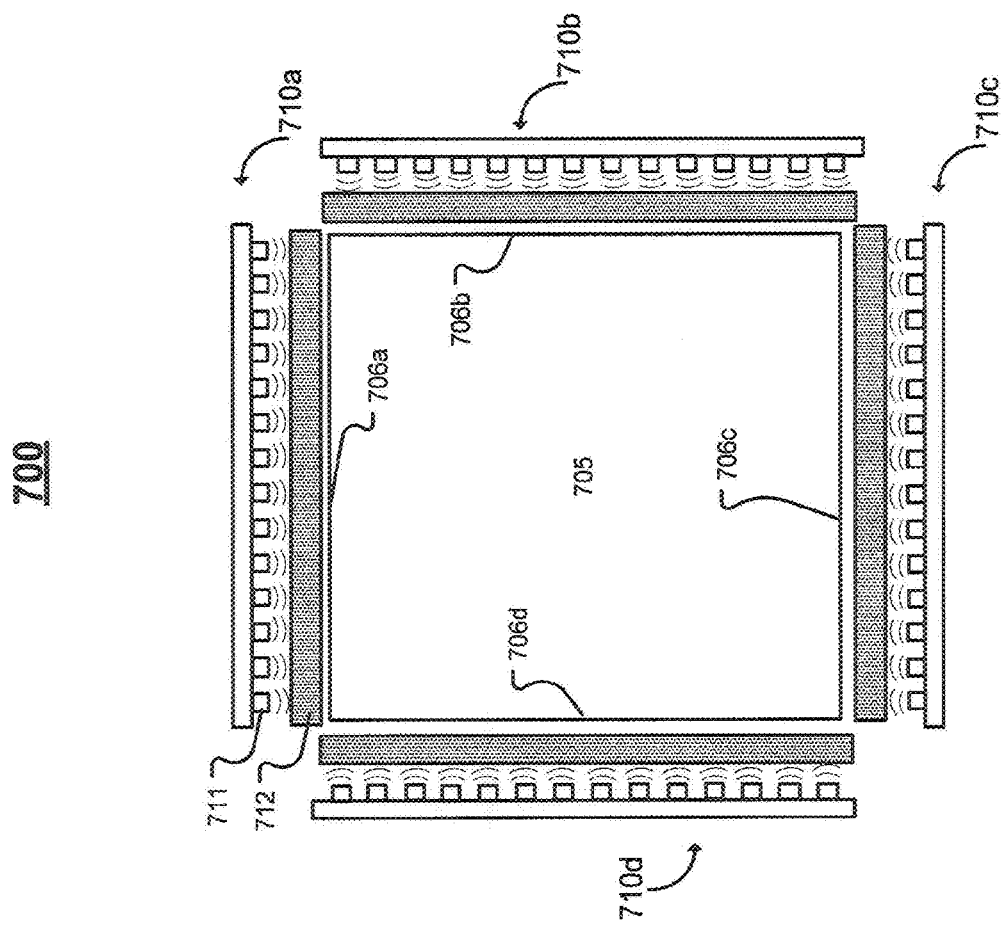

Referring to FIG. 7A, a front view of a system 700 is illustrated. The system 700 may be similar to the system 200 discussed above with respect to FIG. 2 and/or the system 300 discussed above with respect to FIG. 3. A screen 705 includes edges 706a, 706b, 706c, and 706d. In the implementation shown in FIG. 7, sources 710a, 710b, 710c, and 710d are positioned at, adjacent to, and/or above the edges 706a, 706b, 706c, and 706d, respectively, and the sources 710a, 710b, 710c, and 710d create a light curtain that substantially covers the screen 705. The sources 710a, 710b, 710c, and 710d project the light curtain parallel to the screen 705 and offset from a surface of the screen 705. The sources 710a, 710b, 710c, and 710d include emitters 711 and channels 712. In some implementations, the screen 705 may include more or fewer edges. In some implementations, one or more of the edges of the screen 705 do not have a corresponding source. For example, in these implementations, two edges may have a corresponding source and two edges do not have a corresponding source.

Figure 7B:
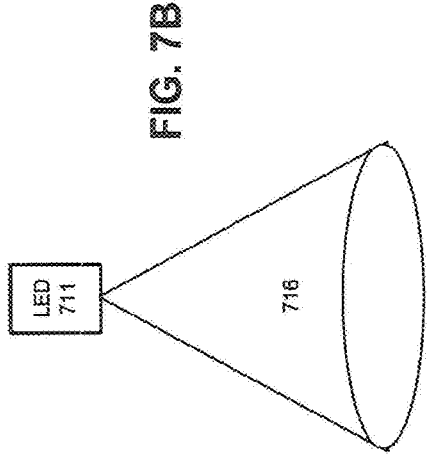
Figure 7D:
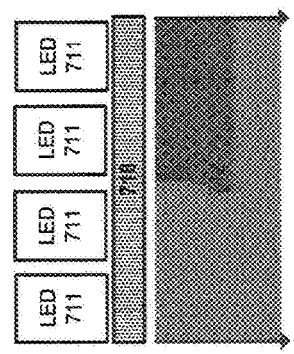
Figure 7C:
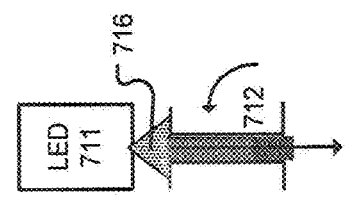

Referring to FIGS. 7B-7D, an example emitter 711 that is an LED is shown. In particular, FIG. 7B shows the emitter 711, FIG. 7C shows a side view of the emitter 711, and FIG. 7D shows a front view of an array of emitters 711. The emitter 711 emits electromagnetic radiation as a cone of light 716. A portion of the cone of light 716 passes through the channel 712 and emerges as the light curtain. The channel 712 may be made of a material that blocks light and/or a material that is not reflective. The material that makes the channel 712 may block light on two sides of the channel. In some implementations, the channel 712 may have sides of glass or plexiglass, either of which may be modified to prevent reflection of light inside the channel. For example, the plexiglass or glass may be ground or sandblasted such that the glass or plexiglass has a diffuse, rough surface. The channel 712 may be filled with air. In some implementations, the emitters may be line lasers emit radiation that is relatively collimated. In these implementations, because the emitters emit radiation that is not diverging, the light curtain may be created without necessarily using the channel 712.

Figure 8B:
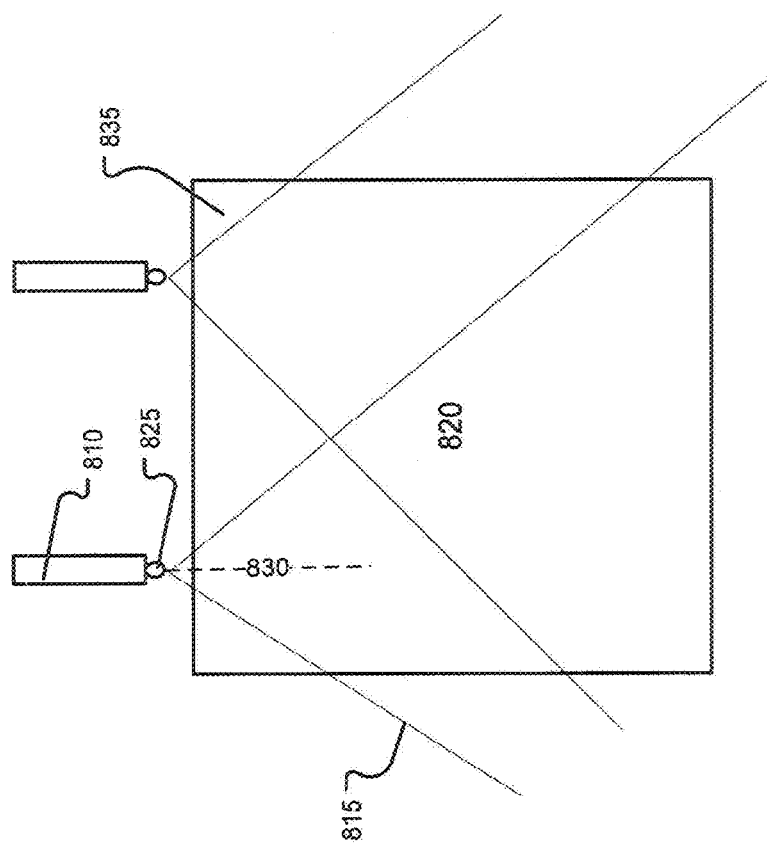
FIGS. 8A and 8B illustrate an exemplary source of electromagnetic radiation.
Figure 8A:
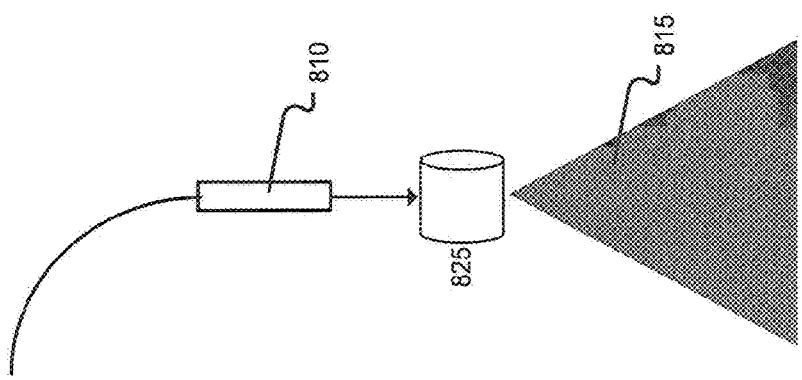

Referring to FIGS. 8A and 8B, an example in which a laser source 810 produces a light curtain 815 is illustrated. The laser source 810 may be an infrared laser source. The laser source 810 produces light that does not diverge as much as light emitted from an LED. Thus, a channel such as the channel 712 discussed above may not be necessary to create a light curtain that substantially covers a screen 820. A cylindrical lens 825 may be used to make a thin plane of light from the laser 810. The cylindrical lens 825 distributes a beam of light emitted from the laser 810 along a line. The distributed beam makes a thin plane of light 815 that is projected parallel to and above a surface of a screen 820, and the distributed beam effectively covers the screen 820. Referring in particular to FIG. 8B, an example of an arrangement of line lasers 810 with associated cylindrical lenses 825 are shown with the screen 820. The intensity of the light emitted from the line lasers 810 diminishes as the distance from a center point 830 increases. Thus, multiple lasers 810 are generally used to effectively cover the screen 820 with the curtain of light 815 of a particular intensity.

In the example shown in FIG. 8B, portions of the screen are not covered by the light curtain created from the multiple line lasers. For example, a portion 835 is not covered by the light curtain. Thus, objects in front of the portion 835 of the screen 820 do not reflect electromagnetic radiation from the flashing light curtain onto the screen because the flashing light curtain does not illuminate objects in front of the portion 835. As a result, the position of such objects is not determined. In some implementations, portions of the screen 820 are not covered by the flashing light curtain intentionally. For example, the portion 835 may correspond to locations in the projection application where the user cannot select an item. The portion 835 may correspond to a region in the projection shown on the screen that is not part of the application.

Figure 9:
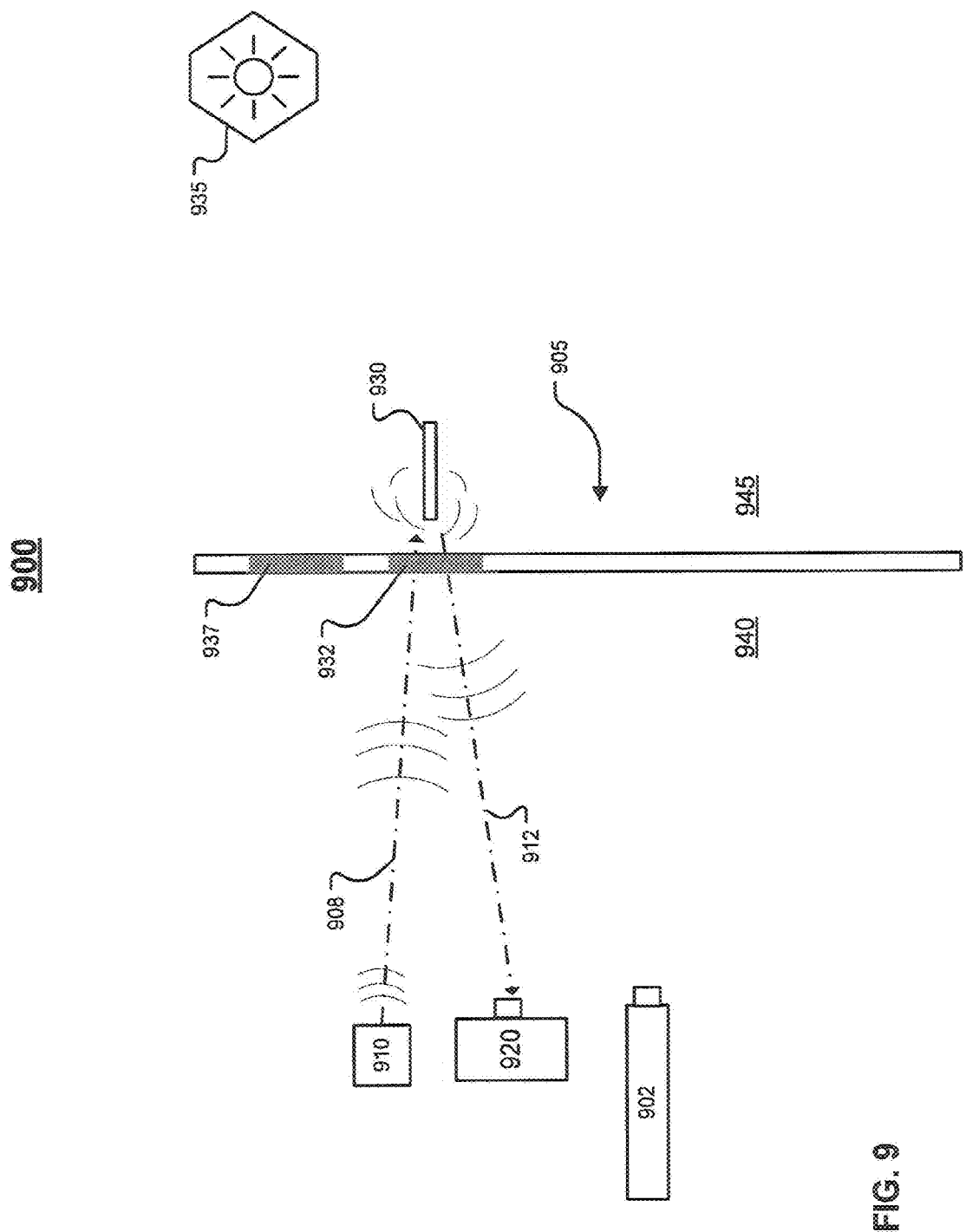

Referring to FIG. 9, and a system 900 is illustrated. A projector 902 projects an image of an application on a screen 905. The application may be implemented as a software application or hardware module. Flashing electromagnetic radiation 908 from a source 910 passes through the screen 905 and illuminates an object 930, and light 912 reflected from the object 930 while the object 930 is illuminated by the source 910 creates a bright spot 932 on the screen 905 that is imaged by a sensor 920. The source 910 is configured to alternate between emitting the electromagnetic radiation and extinguishing the electromagnetic radiation at a rate of flashing. Additionally, an ambient light source 935 creates a bright spot 937 that is imaged by the sensor 920. The system 900 tracks a position of the object 930 with respect to the screen 905 and controls the application based on the position of the object 930.

Similar to the system 200, the system 900 tracks a position of an object 930 with respect to a screen 905 and controls the application based on the position of the object 930. However, in the system 900, the source 910 and the object 930 are located on opposite sides of the screen 905. In particular, the source 910 is located on a first side 940 of the screen 905, and the object 930 is located on a second side 945 of the screen 905. Additionally, in this example, the ambient light source 935 is located on the second side 945 of the screen 905.

Figure 10:
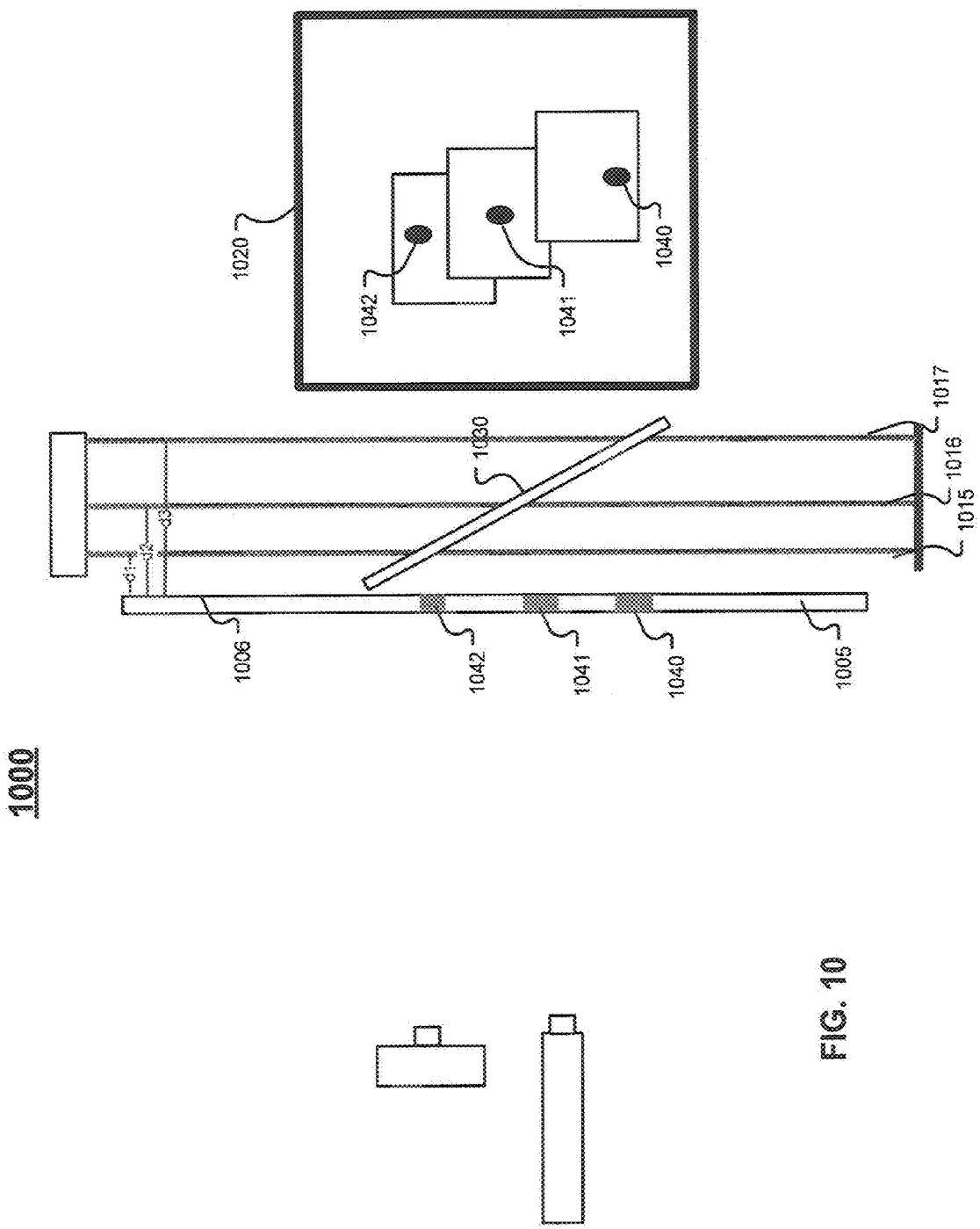

Referring to FIG. 10, a system 1000 determines one or more positions of an object 1030 as the object 1030 is illuminated by multiple flashing light curtains 1015, 1016, and 1017. The flashing light curtains 1015, 1016, and 1017 are located at distances d1, d2, and d3, respectively, from a surface 1006 of a screen 1005. In the example shown, the object 1030 intersects the flashing light curtains 1015, 1016, and 1017 at multiple locations simultaneously. A snapshot 1020 shows the locations of the object 1030 with respect to the screen 1005. The multiple positions may be used to, for example, determine a trajectory of motion of the object 1030. Bright spots 1040, 1041, and 1042 are caused by the object reflecting light from the flashing light curtains 1015, 1016, and 1017, respectively, onto the screen 1005.

Figure 11:
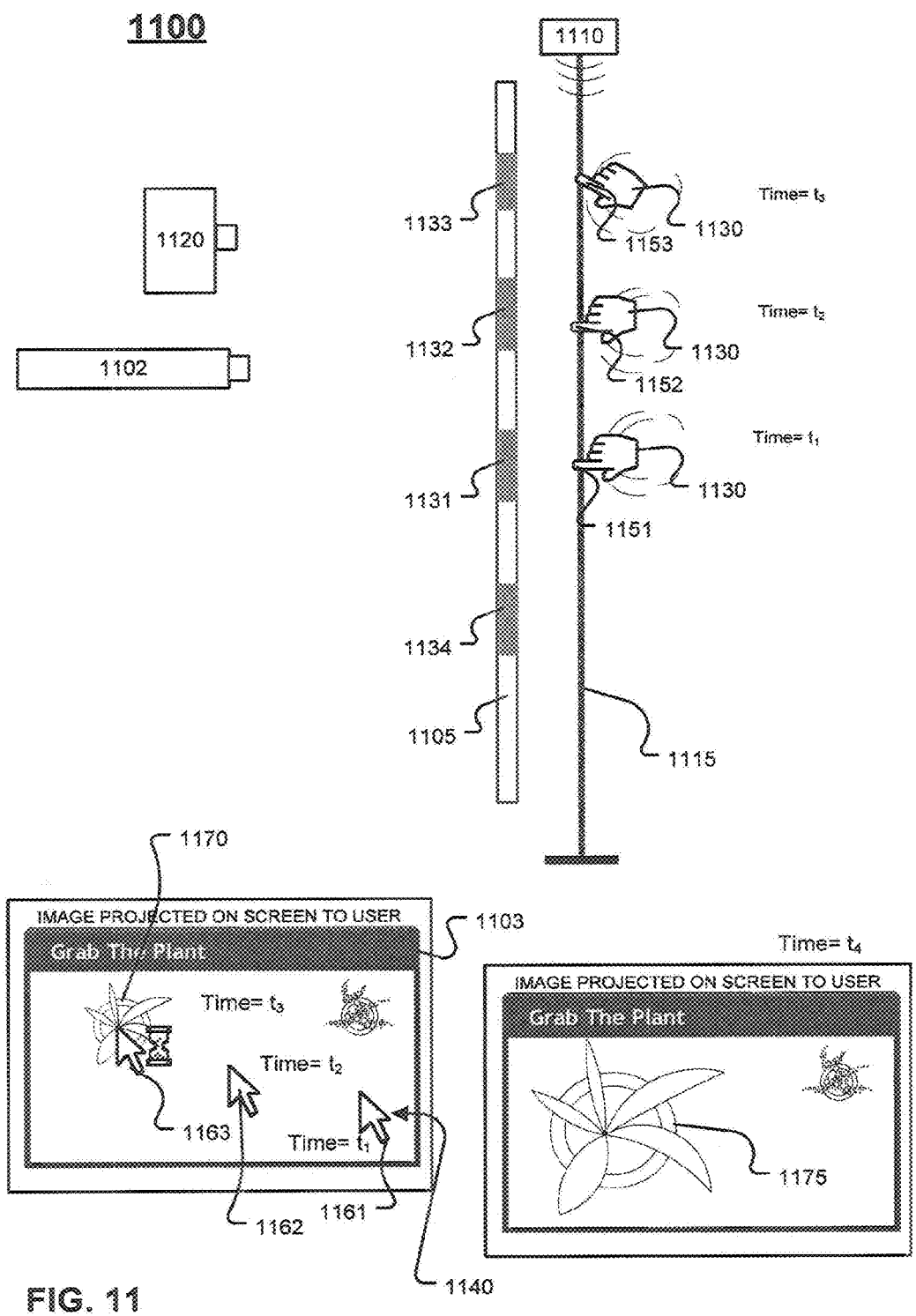
FIG. 11 shows an exemplary system and concomitant controlled application.

Referring to FIG. 11, a system 1100 is illustrated. A projector 1102 projects an image of an application 1103 "Grab the Plant" on a screen 1105. A source 1110 emits electromagnetic radiation to create a flashing curtain of light 1115. A sensor 1120 senses electromagnetic radiation reflected by an object 1130 as the object 1130 moves through the flashing curtain of light 1115. In the example shown in FIG. 11, the object 1130 is a finger of a person, and the object 1130 is shown at three different times $t_1$, $t_2$, and $t_3$ as the object 1130 moves through the light curtain 1115. Electromagnetic radiation from the flashing light curtain reflects off of the object 1130 onto the screen 1105 as bright spots 1131, 1132, and 1133. An ambient light source (not shown) causes a bright spot 1134 on the screen 1105. Although the bright spot 1134 appears on the screen 1105 and is imaged by the sensor 1120, the bright spot 1134 may be removed from the collected data through techniques similar to those discussed above. The corresponding positions 1161, 1162, and 1163 of a cursor 1140 are also shown at each of the three times.

The person moves the object 1130 vertically from a position 1151 at time $t_1$ to a position 1152 at time $t_2$. The cursor 1140 in the controlled application has a corresponding vertical motion from a position 1161 to a position 1162. Between time $t_2$ and time $t_3$, the user moves the object 1130 vertically again from the position 1152 to a position 1153. The plant 1170 is projected on the screen 1105 at the position 1153. Additionally, the user also makes a gesture with the object 1130 such that the object is pointing upward at time $t_3$. The gesture made at time $t_3$ corresponds to a selection (e.g., the equivalent of selecting an item with a mouse click) that occurs at a time $t_4$, which occurs shortly after time $t_3$. Thus, the cursor 1140 in the controlled application has a corresponding vertical motion from the position 1162 to a position 1163. Additionally, the user makes a selection of the plant 1170 through the gesture made at a time $t_3$. Accordingly, the plant 1170 becomes enlarged at the time $t_4$ as a result of the user selecting it by making a gesture in the light curtain.

Implementations may include, for example, a process, a device, or a device for carrying out a process. For example, implementations may include one or more devices configured to perform one or more processes. A device may include, for example, discrete or integrated hardware, firmware, and software. A device may include, for example, computing device or another computing or processing device, particularly if programmed to perform one or more described processes or variations thereof. Such computing or processing devices may include, for example, a processor, an integrated circuit, a programmable logic device, a personal computer, a personal digital assistant, a game device, a cell phone, a calculator, and a device containing a software application. The computing device may be the computing device 201 discussed above with respect to FIG. 2.

Implementations also may be embodied in a device that includes one or more computer readable media having instructions for carrying out one or more processes. The computer readable media may include, for example, storage device, memory, and formatted electromagnetic waves encoding or transmitting instructions. The computer readable media also may include, for example, a variety of non-volatile or volatile memory structures, such as, for example, a hard disk, a flash memory, a random access memory, a read-only memory, and a compact diskette. Instructions may be, for example, in hardware, firmware, software, and in an electromagnetic wave.

Thus, the computing device may represent an implementation of a computing device programmed to perform a described implementation, and the storage device may represent a computer readable medium storing instructions for carrying out a described implementation.

A number of implementations have been described. Nevertheless, it will be understood that various modifications may be made. Accordingly, other implementations are within the scope of the following claims.

What is claimed is:

1. A computer-implemented method comprising:
accessing first and second images of an object, the first image being captured while the object is illuminated with projected electromagnetic radiation, and the second image being captured while the projected electromagnetic radiation is extinguished;
projecting at least a portion of the projected electromagnetic radiation as a first light curtain along and parallel to at least a portion of a first side of a screen;
determining a position of the object relative to the screen based on comparing the first and second images; and
controlling an application based on the determined position.

2. The method of claim 1, further comprising: projecting electromagnetic radiation as a second light curtain adjacent and parallel to the first side of the screen, the first light curtain and the second light curtain being parallel to each other and disposed at a first location and a second location with respect to the first side of the screen.

3. The method of claim 1, wherein:
at least a portion of the projected electromagnetic radiation reflects off of the object and illuminates a portion of the screen; and
determining a position of the object includes identifying the illuminated portion of the screen.

4. The method of claim 3, wherein the determining the position of the object includes identifying a size and shape of the illuminated portion of the screen.

5. The method of claim 1, further comprising determining a second position, and wherein the application is controlled based on the determined position and the second position.

6. The method of claim 1, wherein:
the first image and the second image are captured on one side of the screen; and
the object is disposed on a second side of the screen.

7. The method of claim 1, further comprising projecting electromagnetic radiation with at least one of a light-emitting diode (LED) or a laser.

8. The method of claim 1, wherein the projected electromagnetic radiation comprises infrared radiation.

9. The method of claim 1, wherein a visible image is displayed on the screen, the object is in motion, and controlling an application based on the determined position comprises controlling a cursor on the visible image such that motion of the cursor corresponds to the motion of the object.

10. The method of claim 9 wherein the motion of the object comprises a gesture made by a person.

11. The method of claim 1, wherein accessing first and second images comprises accessing first and second images of an object and a second object, the object and the second object disposed on the same side of the screen, and further comprising determining a position of the second object relative to the screen.

12. The method of claim 1, further comprising modeling a shadow cast on the screen, the shadow cast by the object while the object is illuminated with the projected electromagnetic radiation.

13. The method of claim 12, further comprising determining, based on the model, that the shadow obscures a second object and further comprising determining a position of the second object relative to the screen based at least in part on accounting for the shadow.

14. A system comprising:
a screen;
a source of electromagnetic radiation, the source configured to:
alternate between emitting the electromagnetic radiation and extinguishing the electromagnetic radiation at a rate of flashing, and
project the electromagnetic radiation as a light curtain along and parallel to a surface of the screen;
a sensor configured to sense electromagnetic radiation at the rate of flashing when the electromagnetic radiation is reflected from an object disposed in the vicinity of the screen; and
a processor configured to:
determine a position of the object based on the sensed electromagnetic radiation, and
control an application based on the determined position of the object.

15. The system of claim 14, wherein the screen comprises edges, and the source of electromagnetic radiation comprises at least one emitter positioned along one or more of the edges of the screen.

16. The system of claim 15, wherein the source of electromagnetic radiation comprises one or more arrays of emitters positioned along one or more of the edges of the screen.

17. The system of claim 14, wherein the sensor comprises an array of pixels.

18. The system of claim 14, wherein the source of electromagnetic radiation comprises a series of linear arrays of emitters, each of the linear arrays positioned on a certain side of the screen at a distance from the surface of the screen.

19. The system of claim 14, wherein the source of electromagnetic energy emits diverging electromagnetic energy, and further comprising a channel adjacent to the source, the channel configured to collimate the emitted electromagnetic energy.

20. The system of claim 19, wherein the channel comprises a block of material with a passageway extending through the block from an entry to an exit, the diverging electromagnetic energy impinging on the entry and a portion of the diverging electromagnetic energy emerging from the exit as collimated electromagnetic energy.

21. The system of claim 19, wherein the channel comprises a lens.

22. The system of claim 14, wherein the source of electromagnetic radiation comprises an emitter positioned on a first side of the screen, the source of electromagnetic radiation configured to emit electromagnetic radiation that passes through the screen and interacts with the object disposed on a second side of the screen.

23. The system of claim 14, wherein the source of electromagnetic radiation comprises a light emitting diode.

24. The system of claim 23, wherein the light emitting diode emits infrared radiation.

25. The system of claim 14, wherein the processor is further configured to model a shadow cast by the object and determine a position of a second object disposed on the second side of the screen based on the modeled shadow.

26. A computer program product, embodied in a non-transitory machine-readable medium, the computer program product comprising instructions that, when read by a machine, operate to cause a data processing apparatus to:

project electromagnetic radiation as a first light curtain along and parallel to at least a portion of a first side of a screen;

access first and second images of an object, the first image being captured while the object is illuminated with the projected electromagnetic radiation, and the second image being captured while the projected electromagnetic radiation is extinguished;

determine a position of the object relative to the screen based on comparing the first and second images; and control an application based on the determined position.

27. The computer program product of claim 26, further including instructions that operate to cause the data processing apparatus to determine a second position, wherein the application is controlled based on the determined position and the second position.

28. The method of claim 26, further comprising instructions that operate to cause the data processing apparatus to model a shadow cast on the screen, the shadow cast by the object while the object is illuminated with the projected electromagnetic radiation.

29. A system comprising:
means for projecting electromagnetic radiation as a light curtain in the vicinity of a screen, wherein the means for projecting electromagnetic radiation is configured to alternate between emitting the electromagnetic radiation and extinguishing the electromagnetic radiation at a rate of flashing;

means for sensing electromagnetic radiation at the rate of flashing when the electromagnetic radiation is reflected from an object disposed in the vicinity of the screen;

means for determining a position of the object based on the sensed electromagnetic radiation; and means for controlling an application based on the determined position of the object.

30. The system of claim 29, wherein the means for projecting electromagnetic radiation emits diverging electromagnetic energy, and further comprising means for collimating the emitted electromagnetic energy.

31. The system of claim 29, further comprising means for:
modeling a shadow cast by the object, and
determining a position of a second object based on the modeled shadow.

* * * * *